US009852438B2

(12) United States Patent
Guiney et al.

(10) Patent No.: US 9,852,438 B2
(45) Date of Patent: Dec. 26, 2017

(54) SYSTEMS AND METHODS FOR PEER-TO-PEER REWARD POINTS TRANSFER OVER MOBILE DEVICES

(71) Applicant: MasterCard International Incorporated, Purchase, NY (US)

(72) Inventors: Christopher Andrew Guiney, Fenton, MO (US); Saurabh Singh, St. Louis, MO (US); Ramchandran Venkatesh, St. Louis, MO (US); Hao Sun, University City, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 709 days.

(21) Appl. No.: 14/145,195

(22) Filed: Dec. 31, 2013

(65) Prior Publication Data

US 2015/0186914 A1 Jul. 2, 2015

(51) Int. Cl.
*G06Q 30/02* (2012.01)
*H04W 4/00* (2009.01)
*G06Q 20/10* (2012.01)
*G06Q 20/22* (2012.01)
*G06Q 20/32* (2012.01)
*G06Q 20/38* (2012.01)
*H04W 4/20* (2009.01)

(52) U.S. Cl.
CPC ......... *G06Q 30/0226* (2013.01); *G06Q 20/10* (2013.01); *G06Q 20/223* (2013.01); *G06Q 20/3221* (2013.01); *G06Q 20/387* (2013.01); *H04W 4/008* (2013.01); *H04W 4/20* (2013.01)

(58) Field of Classification Search
CPC .. G06Q 30/0226; G06Q 20/10; G06Q 20/223; G06Q 20/3221; G06Q 20/387; H04W 4/008; H04W 4/20
USPC ...................................................... 705/14.27
See application file for complete search history.

(56) References Cited

U.S. PATENT DOCUMENTS 7,050,996 B1 5/2006 Blagg et al.
7,076,465 B1 7/2006 Blagg et al.
(Continued)

OTHER PUBLICATIONS

Microsoft Computer Dictionary, Fifth Edition, 2002, Microsoft Press, p. 23.*
(Continued)

*Primary Examiner* — David Stoltenberg
*Assistant Examiner* — Michael Ezewoko
(74) *Attorney, Agent, or Firm* — Armstrong Teasdale LLP

(57) ABSTRACT

A computer-implemented method for transferring reward points between mobile computing devices is implemented by a first mobile computing device. The method includes receiving a first reward points balance associated with a first reward points account, detecting a second mobile computing device associated with a second reward points account wherein the second reward points account has a second reward points balance, initiating a transfer request from the first mobile computing device to the second mobile computing device, and sending a transfer command to a rewards program computer system wherein the transfer command instructs the rewards program computer system to transfer the at least one reward point between the first reward points account and the second reward points account.

20 Claims, 9 Drawing Sheets

(56) References Cited

U.S. PATENT DOCUMENTS

| | | | |
|---|---|---|---|
| 7,340,423 B1 | 3/2008 | Blagg et al. | |
| 7,467,096 B2* | 12/2008 | Antonucci | G06Q 30/02 705/14.27 |
| 7,624,038 B1 | 11/2009 | Wood et al. | |
| 7,630,935 B2 | 12/2009 | Loeger et al. | |
| 7,979,353 B2 | 7/2011 | Akama | |
| 8,050,968 B2 | 11/2011 | Antonucci et al. | |
| 8,065,182 B2 | 11/2011 | Voltmer et al. | |
| 8,073,736 B2 | 12/2011 | Blagg et al. | |
| 8,108,304 B2 | 1/2012 | Loeger et al. | |
| 8,151,335 B2* | 4/2012 | Wankmueller | G06Q 20/04 370/254 |
| 8,180,671 B2 | 5/2012 | Cohagan et al. | |
| 2003/0171992 A1 | 9/2003 | Blagg et al. | |
| 2004/0049452 A1 | 3/2004 | Blagg | |
| 2005/0251446 A1 | 11/2005 | Jiang et al. | |
| 2006/0208060 A1 | 9/2006 | Mendelovich et al. | |
| 2006/0208064 A1 | 9/2006 | Mendelovich et al. | |
| 2006/0208065 A1 | 9/2006 | Mendelovich et al. | |
| 2006/0287964 A1* | 12/2006 | Brown | G06Q 20/26 705/64 |
| 2008/0091582 A1 | 4/2008 | Blagg et al. | |
| 2010/0088174 A1 | 4/2010 | Cohagan et al. | |
| 2011/0238553 A1* | 9/2011 | Raj | G06Q 20/10 705/37 |
| 2012/0010937 A1 | 1/2012 | Hanson et al. | |
| 2012/0016730 A1 | 1/2012 | Antonucci et al. | |
| 2012/0022930 A1 | 1/2012 | Brouhard | |
| 2012/0197707 A1 | 8/2012 | Cohagan et al. | |
| 2012/0215610 A1* | 8/2012 | Amaro | G06Q 30/02 705/14.23 |
| 2013/0030887 A1 | 1/2013 | Calman et al. | |
| 2013/0132185 A1 | 5/2013 | Antonucci et al. | |

OTHER PUBLICATIONS

Mind—A Brief Introduction, John R. Searle, 2004, Oxford University Press, pp. 62-67.*

What is Thought, Eric Baum, The MIT Press, 2004, pp. 33-65.*

"Citi lets customers share reward points via Facebook", USA Today, http://usatoday30.usatoday.com/money/industries/banking/story/2012-01-03/citibank-rewards-point-sharing-Facebook/52355926/1.

"Discover B Connected Social", https://www.bconnectedonline.com/b-connected-social.

* cited by examiner

SYSTEMS AND METHODS FOR PEER-TO-PEER REWARD POINTS TRANSFER OVER MOBILE DEVICES

BACKGROUND OF THE DISCLOSURE

The field of the disclosure relates generally to reward points programs, and more particularly, to systems and methods for facilitating peer-to-peer transfers of reward points using mobile devices.

At least some known rewards programs exist to incentivize consumer behavior, including consumer transactions. Some known consumer transactions accordingly include the receipt of reward points by a consumer into a reward points account associated with the consumer. Although some such consumer transactions are financial transactions, consumers may earn reward points through other means including promotions, social games, and surveys. Reward points accounts are managed and facilitated by a rewards program sponsor (a "sponsor"). Rewards program sponsors may include banks, merchants, and other providers of goods and services. Some reward points may be used or redeemed and converted into goods, services, discounts, and other promotions (collectively referred to as "rewards"). Rewards program sponsors may additionally collaborate with third-party entities (e.g., the provider of a social game that may provide reward points to consumers, or the provider of rewards) to facilitate the rewards program. Each reward is typically associated with a specific reward point amount which must be exchanged to receive the reward. In at least some situations, multiple consumers may wish to collect reward points into one reward points account because an individual consumer lacks sufficient reward points to earn a reward but multiple consumers acting together can aggregate points to earn the reward. Accordingly, a method for use in transferring reward points between consumers ("peers") is desirable.

BRIEF DESCRIPTION OF THE DISCLOSURE

In one aspect, a computer-implemented method for transferring reward points between mobile computing devices is provided. The method is implemented by a first mobile computing device in communication with a memory. The method includes receiving a first reward points balance associated with a first reward points account, detecting a second mobile computing device associated with a second reward points account wherein the second reward points account has a second reward points balance, initiating a transfer request from the first mobile computing device to the second mobile computing device wherein the transfer request represents a request from the first mobile computing device to the second mobile computing device to transfer at least one reward point between the first reward points account and the second reward points account, and sending a transfer command to a rewards program computer system wherein the transfer command instructs the rewards program computer system to transfer the at least one reward point between the first reward points account and the second reward points account upon successfully completing the transfer request.

In another aspect, a computer-implemented method for facilitating the transfer of reward points between a plurality of mobile computing devices is provided. The method is implemented by a rewards program computer system in communication with a memory. The method includes receiving a transfer command from a first mobile computing device wherein the transfer command instructs the rewards program computer system to transfer at least one reward point between a first reward points account associated with the first mobile computing device and a second reward points account associated with a second mobile computing device, retrieving a first reward points balance associated with the first reward points account and a second reward points balance associated with the second reward points account, updating the first reward points balance and the second reward points balance by processing the transfer command upon validating the transfer command, and transmitting an updated balance amount to at least one of the first mobile computing device and the second mobile computing device.

In a further aspect, a system for facilitating the transfer of reward points between a plurality of mobile computing devices is provided. The system includes a rewards program computer system including a processor in communication with a memory. The processor is configured to receive a transfer command from a first mobile computing device wherein the transfer command instructs the rewards program computer system to transfer at least one reward point between a first reward points account associated with the first mobile computing device and a second reward points account associated with a second mobile computing device, retrieve a first reward points balance associated with the first reward points account and a second reward points balance associated with the second reward points account, update the first reward points balance and the second reward points balance by processing the transfer command upon validating the transfer command, and transmit an updated balance amount to at least one of the first mobile computing device and the second mobile computing device.

BRIEF DESCRIPTION OF THE DRAWINGS

The figures listed below show example embodiments of the methods and systems described herein.

FIG. 1 is a schematic diagram illustrating an example multi-party payment card industry system for enabling ordinary payment-by-card transactions, including transactions associated with reward points, in which merchants and card issuers do not necessarily have a one-to-one relationship.

FIG. 2 is a block diagram of an example system including a rewards program computer system in communication with a plurality of mobile computing devices in accordance with one example embodiment of the present disclosure.

FIG. 3 illustrates an example configuration of a mobile computing device shown in FIG. 2.

FIG. 4 illustrates an example configuration of a server system such as the rewards program computer system shown in FIG. 2.

FIG. 5 is a data flow diagram of the mobile computing devices shown in FIG. 3 communicating with the rewards program computer system shown in FIG. 4.

FIG. 6 is a second data flow diagram of the mobile computing devices shown in FIG. 3 communicating with the rewards program computer system shown in FIG. 4.

FIG. 7 is a diagram of an example method for use in transferring reward points between a plurality of mobile computing devices shown in FIG. 3 using the mobile computing device of FIG. 3.

FIG. 8 is a diagram of an example method for facilitating the transfer of reward points between a plurality of mobile computing devices shown in FIG. 3 using the rewards program computer system of FIG. 4.

FIG. 9 is a diagram of components of one or more example rewards program computer systems that may be used in the environment shown in FIGS. 5 and 6.

Figure 1:
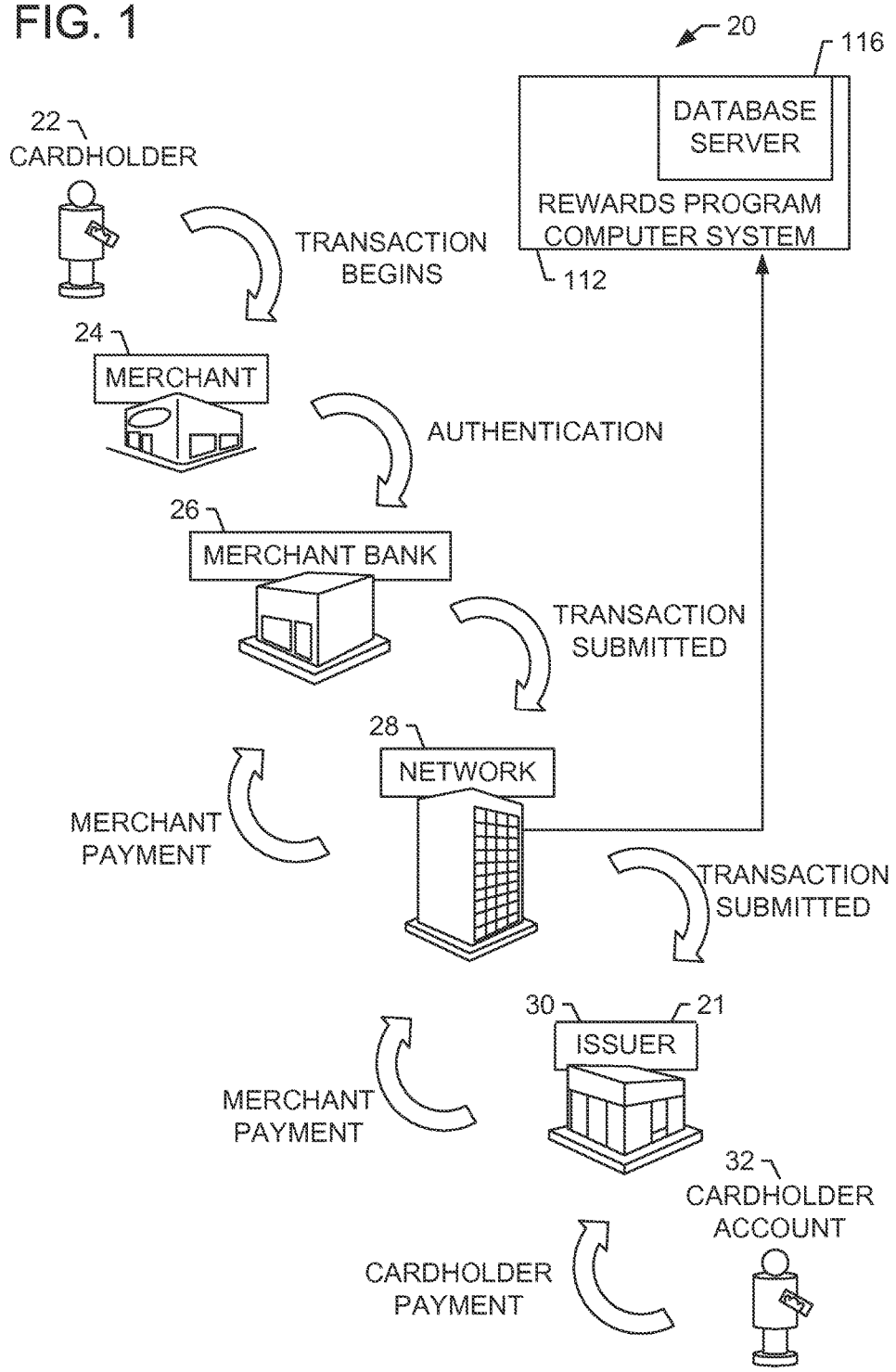
FIGS. 1-9 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

This subject matter described herein relates generally to reward points programs (hereinafter referred to as "reward programs"), and more particularly, to systems and methods for facilitating peer-to-peer transfer of reward points using mobile devices. A first mobile computing device associated with a first rewards program participant (hereinafter referred to as, "participant") may initiate a request to transfer reward points to a second participant wherein the second participant uses a second mobile computing device. Specifically, the methods and systems facilitate receiving at a first mobile computing device a first reward points balance associated with a first reward points account, detecting a second mobile computing device associated with a second reward points account wherein the second reward points account having a second reward points balance, initiating a transfer request from the first mobile computing device to the second mobile computing device, the transfer request representing a request from the first mobile computing device to the second mobile computing device to transfer at least one reward point between the first reward points account and the second reward points account, and sending a transfer command to a rewards program computer system that instructs the rewards program computer system to transfer the at least one reward point between the first reward points account and the second reward points account upon successfully completing the transfer request.

Rewards programs are used by merchants, issuer banks, and other entities to incentivize consumer behavior, including to incentivize consumer transactions. Some known consumer transactions accordingly include the receipt of reward points by a consumer into a reward points account associated with the consumer. For example, a rewards program may exist wherein a customer receives reward points for each transaction. Alternately, the customer may receive reward points for purchasing products from particular merchants, for purchasing particular categories of products, or for purchasing particular values of products. Although some reward points are earned due to financial transactions, consumers may alternately earn reward points through other means including participation in promotions, social games, and surveys. Reward points accounts are managed and facilitated by a rewards program sponsor (a "sponsor"). Rewards program sponsors may include banks, merchants, and other providers of goods and services. Some reward points may be used or redeemed and converted into goods, services, discounts, and other promotions (collectively referred to as "rewards"). Rewards program sponsors may additionally collaborate with third-party entities (e.g., the provider of a social game that may provide reward points to consumers, or the provider of rewards) to facilitate the rewards program. Each reward is typically associated with a specific reward point amount which must be exchanged to receive the reward. For example, reward X may be redeemed for 20,000 points. When reward points are used by a consumer to obtain rewards, a corresponding number of reward points are withdrawn from the reward points account associated with the consumer. For example, consumer B may have 30,000 points in her account and wish to obtain reward X. Consumer B may obtain reward X and be left with a reward points balance of 10,000 points in her reward points account. In at least some situations, multiple consumers may wish to collect reward points into one reward points account because an individual consumer lacks sufficient reward points to earn a reward but multiple consumers acting together can aggregate points to earn the reward. For example, consumers C and D may wish to collectively obtain reward X but consumer C has a reward points balance of 11,000 and consumer D has a reward points balance of 10,000. Individually, neither consumer can obtain reward X. However, by pooling their reward points together into one reward points account (e.g., consumer C's reward points account), they can obtain reward X. As a result, some consumers may benefit from methods and systems to facilitate transfer of reward points.

The systems and methods described herein are configured to facilitate transferring reward points between mobile computing devices. More specifically, a first mobile computing device receives a reward points balance associated with a first reward points account. The first mobile computing device detects a second mobile computing device associated with a second reward points account. The second reward points account also has a second reward points balance.

The first mobile computing device detects the second mobile computing device using any appropriate protocol of communication associated with mobile computing devices including, without limitation and as described below, near field communication. In some examples, the first mobile computing device may detect mobile computing devices that are within a proximity range. The proximity range may be determined by, for example, the user of the first mobile computing device, the communication protocol, the rewards program, and the first mobile computing device. In one example, the first mobile computing device may detect second mobile computing devices within a range of one hundred meters from the first mobile computing device, based on a user definition. In other examples, the first mobile computing device may only detect mobile computing devices which are associated with the first reward points account of the first mobile computing device. In such examples, the first reward points account may include lists of, for example and without limitation, "Friends" or "Contacts." In this example, the first mobile computing device detects mobile computing devices associated with reward points accounts associated with the list of "Friends" or "Contacts." In additional examples, the first mobile computing device detects mobile computing devices within a defined proximity range and additionally with reward points accounts associated with the list of "Friends" or "Contacts." In some examples, the association between first reward points accounts and second reward points accounts is stored at the memory of the first mobile computing device. In other examples, the association between first reward points accounts and second reward points accounts is stored in the memory of rewards program computer system. In such examples, detecting the second mobile computing device also includes first mobile computing device sending an identifier for the first reward points account to the rewards program computer system that is received by the rewards program computer system. The rewards program computer system retrieves, from memory, a plurality of second reward points accounts associated with the first reward points account and transmits the plurality of second reward points accounts to the first mobile computing device. The first mobile computing device accordingly receives the plurality of second reward points accounts and detects second mobile computing devices based on the received information.

In some examples, when the first mobile computing device detects the second mobile computing device, the first mobile computing device and second mobile computing device exchange information related to their respective reward points accounts. Such exchange may be useful for effective use of the systems and methods described herein because users of the first and second mobile computing devices may be made aware of available balances associated with each reward points account. Accordingly, detecting the second mobile computing device may additionally include transmitting the first reward points balance to the second mobile computing device. In some examples, detecting the second mobile computing device may also include receiving a second reward points balance associated with the second reward points account from the second mobile computing device.

The first mobile computing device initiates a transfer request to the second mobile computing device. The transfer request represents a request from the first mobile computing device to the second mobile computing device to transfer at least one reward point between the first reward points account and the second reward points account. In other words, the first mobile computing device sends a request to transfer points to the second mobile computing device. Alternately, the first mobile computing device may detect a plurality of secondary mobile computing devices and select a second mobile computing device from the plurality of secondary mobile computing devices and initiate the transfer request to the selected second mobile computing device.

In some examples, initiating the transfer request also includes a verification process. The verification process may be applied based upon user preferences, requirements of the rewards program, the frequency of interaction (e.g., frequency of transfer) between the first reward points account and the second reward points account, and the total amount of points requested to be transferred in the transfer request. For example, some users may wish to verify every transfer to ensure security. In another example, a rewards program may require verification for every transfer. Alternately, users or rewards programs may set standards such that infrequent transferors require verification. Additionally, transfers beyond certain minimum thresholds of reward points may trigger verification. Verification may be accomplished by the first mobile computing device verifying the transfer request with a first verification and further receiving a second verification from the second mobile computing device. The first and second verification may take any appropriate form including, for example, a user-provided authorization of the transfer via a user-input at the first or second mobile computing device, a security check, and any other appropriate method of verification.

In an alternative example, the transfer request may be triggered by the second mobile computing device. In this example, the first mobile computing device receives an initial transfer request from the second mobile computing device. The initial transfer request represents a request by the second mobile computing device for the first mobile computing device to initiate the transfer request. In other words, the second mobile computing device is asking for the first mobile computing device to transfer reward points. The first mobile computing device receives an initial transfer request approval from, for example, a user reviewing the initial transfer request. The first mobile computing device, upon receiving the initial transfer request approval, automatically sends the transfer command to the rewards program computer system.

All communication, including detection and transfer, between the first mobile computing device and the second mobile computing device may be performed using any appropriate wireless communication protocol. In the example embodiment, such communication uses near field communication (NFC). NFC is a set of standards used by mobile computing devices to establish communication by mobile computing devices by bringing the mobile computing devices into proximity with one another. As used herein, NFC may include any communication standard appropriate to such interaction including, without limitation, ISO/IEC 18092/ECMA-340, ISO/IEC 21481/ECMA-352, GSMA, and StoLPaN. Alternatively, as used herein, the communication facilitated NFC may include the use of applications which depend on NFC including, for example and without limitation, Bump™ and Android™ Beam. (Bump is a trademark of Bump Technologies, Inc., Mountain View, Calif.; Android is a trademark of Google Inc., Mountain View, Calif.) Accordingly, using such applications or NFC standards allows a mobile computing device such as the first mobile computing device to identify the presence of other mobile computing devices such as the second mobile computing device. When the first mobile computing device detects the second mobile computing device or, alternately, the plurality of secondary mobile computing devices, the first mobile computing device substantially uses an NFC protocol including, for example, GSMA, or an NFC-based application including, for example, Bump™.

Initiating the transfer request includes defining the conditions of the transfer. Accordingly, initiating the transfer request includes receiving, at the first mobile computing device, a transfer type, a transfer amount, a transfer originator, and a transfer receiver. For example, the transfer request may be a transfer from the first reward points account to the second reward points account or vice versa. The transfer request may also indicate the amount of points transferred. In the example embodiment the transfer originator is the first mobile computing device and the transfer receiver is the second mobile computing device.

The transfer request may be successfully completed when the first mobile computing device receives an indication of approval from the second mobile computing device. For example, the first mobile computing device may receive an approval from the second mobile computing device, validating that the account holder associated with the second mobile computing device and the second reward points account approves of the transaction.

Upon successfully completing the transfer request, the first mobile computing device sends a transfer command to a rewards program computer system. The transfer command instructs the rewards program computer system to transfer at least one reward point between the first reward points account and the second reward points account based upon the conditions of the transfer.

The rewards program computer system receives the transfer command from the first mobile computing device. The transfer command instructs the rewards program computer system to transfer at least one reward point between a first reward points account associated with the first mobile computing device and a second reward points account associated with the second mobile computing device. The rewards program computer system receives the transfer command using any appropriate communication protocol. The received transfer command also includes conditions of the transfer including, for example and without limitation, the transfer type and the transfer amount.

The rewards program computer system may, in some examples, as described above, request authentication from the first and second mobile computing devices. Requesting authentication may occur based upon preferences of users associated with the first reward points account and/or the second reward points account, the preferences of the rewards program, or characteristics associated with the transfer command as described above. The rewards program computer system transmits an authentication request to the first mobile computing device. The authentication request includes, for example and without limitation, a request for a username and password, a request for a secondary security credential, a signature, and any other appropriate security information. The rewards program computer system receives an authentication response from the first mobile computing device. The authentication response includes account credentials associated with the first reward points account. The rewards program computer system checks the authorization response against an authentication record associated with the first reward points account. The authentication record represents a record from a security database including security credentials associated with the first reward points account. Alternately, the rewards program computer system may similarly request authentication from the second mobile computing device.

The rewards program computer system retrieves a first reward points balance associated with the first reward points account and a second reward points balance associated with the second reward points account. The rewards program computer system retrieves the first reward points balance and the second reward points balance from a rewards program database. The rewards program computer system validates the transfer command against the retrieved first reward points balance and the retrieved second reward points balance. The rewards program computer system validates by determining that neither the first reward points balance nor the second reward points balance has a negative value after the transfer command is processed. Alternatively, the rewards program computer system may validate the transfer command to ensure that the transfer command complies with requirements associated with the first reward points account and the second reward points account including, for example, ensuring that the first reward points balance and the second reward points balance meet minimum balance requirements after the transfer command is processed.

In at least some examples, the rewards program computer system may validate that the second mobile computing device authorizes the transfer command before executing the transfer command. Such validation may be valuable to prevent fraud or other misuse. The rewards program computer system sends a validation request to the second mobile computing device, receives a validation response from the second mobile computing device, and confirms the validation response.

Upon validating the transfer command, the rewards program computer system updates the first reward points balance and the second reward points balance by processing the transfer command. Updating the first reward points balance and the second reward points balance substantially represents updating the first reward points account and the second reward points account at the rewards program database. The rewards program computer system transmits an updated balance amount to at least one of the first mobile computing device and the second mobile computing device. The first mobile computing device and the second mobile computing device accordingly receive updated first reward points balance and second reward points balance, respectively, from the rewards program computer system.

In at least some examples, the second mobile computing device may transmit a transfer decline to the rewards program computer system. In some examples, the transfer decline may be made after an initial approval, validation, or authorization. The transfer decline represents the second mobile computing device seeking to stop or reverse the transfer command. The rewards program computer system receives the transfer decline from the second mobile computing device and reverses or aborts the transfer command, depending on whether the transfer command has executed.

Described in detail herein are example embodiments of systems and methods for facilitating the transfer of reward points between a plurality of mobile computing devices. The systems and methods facilitate, for example, receiving a first reward points balance associated with a first reward points account, detecting a second mobile computing device associated with a second reward points account wherein the second reward points account has a second reward points balance, initiating a transfer request from the first mobile computing device to the second mobile computing device wherein the transfer request represents a request from the first mobile computing device to the second mobile computing device to transfer at least one reward point between the first reward points account and the second reward points account, and sending a transfer command to a rewards program computer system wherein the transfer command instructs the rewards program computer system to transfer the at least one reward point between the first reward points account and the second reward points account upon successfully completing the transfer request. The systems and methods also facilitate, for example, receiving a transfer command from a first mobile computing device wherein the transfer command instructs the rewards program computer system to transfer at least one reward point between a first reward points account associated with the first mobile computing device and a second reward points account associated with a second mobile computing device, retrieving a first reward points balance associated with the first reward points account and a second reward points balance associated with the second reward points account, updating the first reward points balance and the second reward points balance by processing the transfer command upon validating the transfer command, and transmitting an updated balance amount to at least one of the first mobile computing device and the second mobile computing device.

A technical effect of the systems and methods described herein include at least one of (a) improving the rate of consumer transactions using rewards programs through effective aggregation of reward points; (b) facilitating reward points redemption through effective aggregation of reward points; and (c) reducing time required to transfer reward points.

More specifically, the technical effects can be achieved by performing at least one of the following steps: (a) receiving, at a first mobile computing device, a first reward points balance associated with a first reward points account; (b)

detecting a second mobile computing device associated with a second reward points account, the second reward points account having a second reward points balance; (c) initiating a transfer request from the first mobile computing device to the second mobile computing device, the transfer request representing a request from the first mobile computing device to the second mobile computing device to transfer at least one reward point between the first reward points account and the second reward points account; (d) sending a transfer command to a rewards program computer system, the transfer command instructing the rewards program computer system to transfer the at least one reward point between the first reward points account and the second reward points account, upon successfully completing the transfer request; (e) initiating the transfer request using near-field communication; (f) receiving an initial transfer request from the second mobile computing device, the initial transfer request representing a request by the second mobile computing device for the first mobile computing device to initiate the transfer request; (g) receiving, at the first mobile computing device, an initial transfer request approval; (h) automatically sending the transfer command to the rewards program computer system; (i) verifying the transfer request with a first verification at the first mobile computing device; (j) receiving a second verification from the second mobile computing device; (k) receiving, at the first mobile computing device, a transfer type and a transfer amount; (l) transmitting the first reward points balance to the second mobile computing device; (m) receiving a second reward points balance associated with the second reward points account from the second mobile computing device; (n) receiving an updated first reward points balance from the rewards program computer system; (o) receiving a transfer command from a first mobile computing device, the transfer command instructing the rewards program computer system to transfer at least one reward point between a first reward points account associated with the first mobile computing device and a second reward points account associated with a second mobile computing device; (p) retrieving a first reward points balance associated with the first reward points account and a second reward points balance associated with the second reward points account from a rewards program database; (q) updating the first reward points balance and the second reward points balance at the rewards program database by processing the transfer command upon validating the transfer command; and (r) transmitting an updated balance amount to at least one of the first mobile computing device and the second mobile computing device.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

As used herein, the terms "rewards program" and "reward points program" refer to any program administered by a rewards program sponsor to incentivize consumer behavior by providing reward points to an account associated with a consumer when the consumer performs a particular activity. In many examples, reward points are provided when the consumer makes a purchase of a good or service. The rewards program sponsor may include banks, merchants, and other providers of goods and services.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to enabling peer-to-peer transfer of reward points between mobile computing devices.

FIG. 1 is a schematic diagram illustrating an example multi-party transaction card industry system 20 for enabling ordinary payment-by-card transactions, including transactions associated with reward points, in which merchants 24 and card issuers 30 do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, such additional data may also include data related to rewards programs managed by a rewards program sponsor utilizing rewards program computer system 112. For example, cardholder 22 may be enrolled in a rewards program that incentivizes certain consumer behavior associated with cardholder 22. Accordingly, the additional data is used to determine whether cardholder 22 engaged in consumer behavior that results in an increase in the reward points balance of cardholder 22. In the example embodiment, when cardholder 22 makes a purchase, a set of additional data is transferred among the parties to the transaction. When interchange network 28 receives the additional data, interchange network 28 routes the additional data to a rewards program computer system 112 that manages the rewards program associated with cardholder 22.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
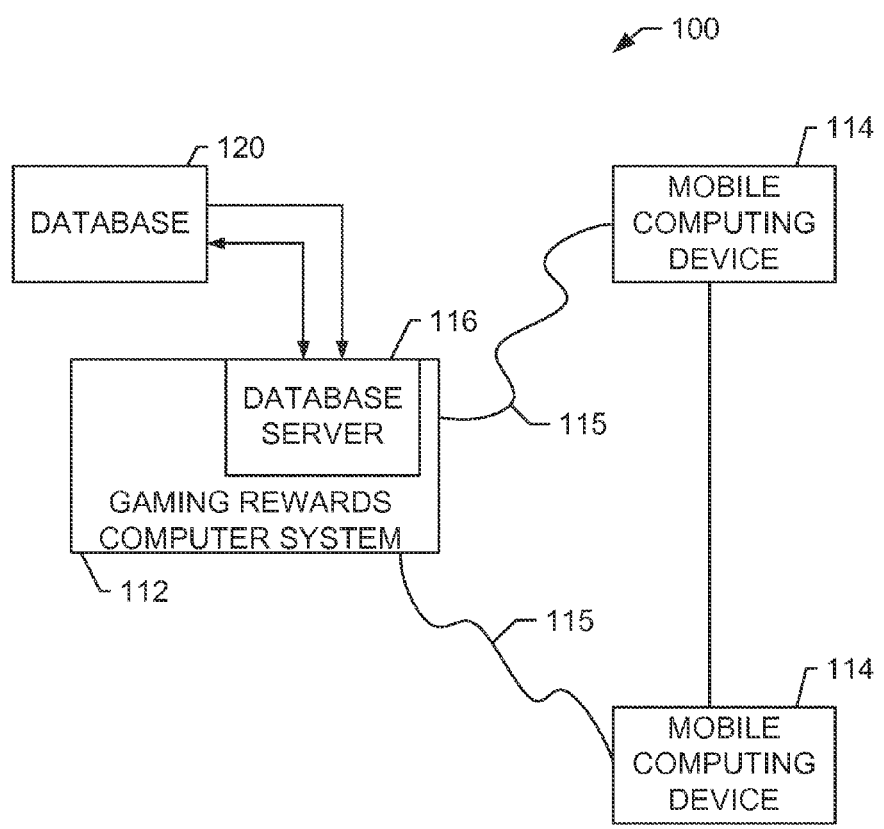

FIG. 2 is a simplified block diagram of an example system 100 including rewards program computer system 112 in communication with a plurality of mobile computing devices 114 in accordance with one example embodiment of the present disclosure. In the example embodiment, system 100 is used to facilitate the transfer of reward points between a plurality of mobile computing devices 114. Mobile computing devices 114 may include any computer device as described herein including, for example and without limitation, smart phones, tablet computers, laptop computers, portable digital assistants, tablet/phone hybrids ("phablets"), or any other similar device.

More specifically, in the example embodiment, system 100 includes a rewards program computer system 112, and a plurality of client sub-systems, also referred to as mobile computing devices 114, connected to rewards program computer system 112. In one embodiment, mobile computing devices 114 are computers including a web browser, such that rewards program computer system 112 is accessible to mobile computing devices 114 using the Internet. Mobile computing devices 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Mobile computing devices 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on rewards program computer system 112 and can be accessed by potential users at one of mobile computing devices 114 by logging onto rewards program computer system 112 through one of mobile computing devices 114. In an alternative embodiment, database 120 is stored remotely from rewards program computer system 112 and may be non-centralized.

Database 120 may include a single database having separated sections or partitions, or may include multiple databases, each being separate from each other. Database 120 may store transaction data generated over the processing network including data relating to merchants, account holders, prospective customers, issuers, acquirers, and/or purchases made. Database 120 may also store account data including at least one of a cardholder name, a cardholder address, an account number, other account identifiers, and transaction information. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of mobile computing devices 114 may be associated with acquirer bank 26 (shown in FIG. 1) while another one of mobile computing devices 114 may be associated with issuer bank 30 (shown in FIG. 1). Rewards program computer system 112 may be associated with interchange network 28. In the example embodiment, rewards program computer system 112 is associated with an interchange network, such as interchange network 28, and may be referred to as an interchange computer system. Rewards program computer system 112 may be used for processing transaction data. In addition, mobile computing devices 114 may include a computer system associated with at least one of an online bank, a bill payment outsourcer, an acquirer bank, an acquirer processor, an issuer bank associated with a transaction card, an issuer processor, a remote payment system, customers and/or billers.

Figure 3:
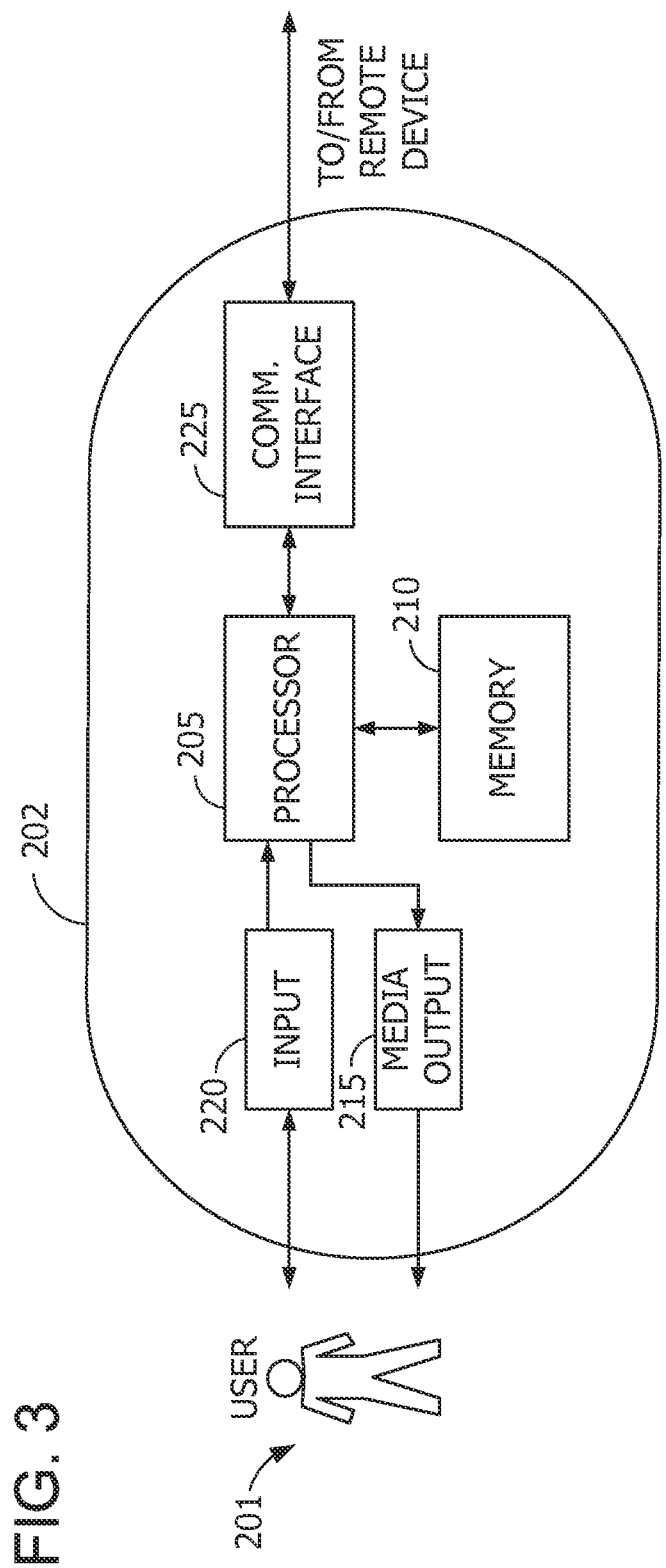

FIG. 3 illustrates an example configuration of a user system 202 operated by a user 201, such as cardholder 22 (shown in FIG. 1). User system 202 may include, but is not limited to, mobile computing device 114. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as rewards program computer system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

User system 202 is also capable of NFC communication. NFC is a set of standards used by mobile computing devices to establish communication by mobile computing devices 114 by bringing the mobile computing devices into proximity with one another. As used herein, NFC may include any communication standard appropriate to such interaction including, without limitation, ISO/IEC 18092/ECMA-340, ISO/IEC 21481/ECMA-352, GSMA, and StoLPaN. Alternatively, as used herein, the communication facilitated NFC may include the use of applications which depend on NFC including, for example and without limitation, Bump™ and Android™ Beam. (Bump is a trademark of Bump Technologies, Inc., Mountain View, Calif.; Android is a trademark of Google Inc., Mountain View, Calif.) Accordingly, using such applications or NFC standards allows mobile computing device 114 to identify the presence of other mobile computing devices 114 and communicate with such other mobile computing device 114.

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from rewards program computer system 112. A client application allows user 201 to interact with a server application from rewards program computer system 112.

Figure 4:
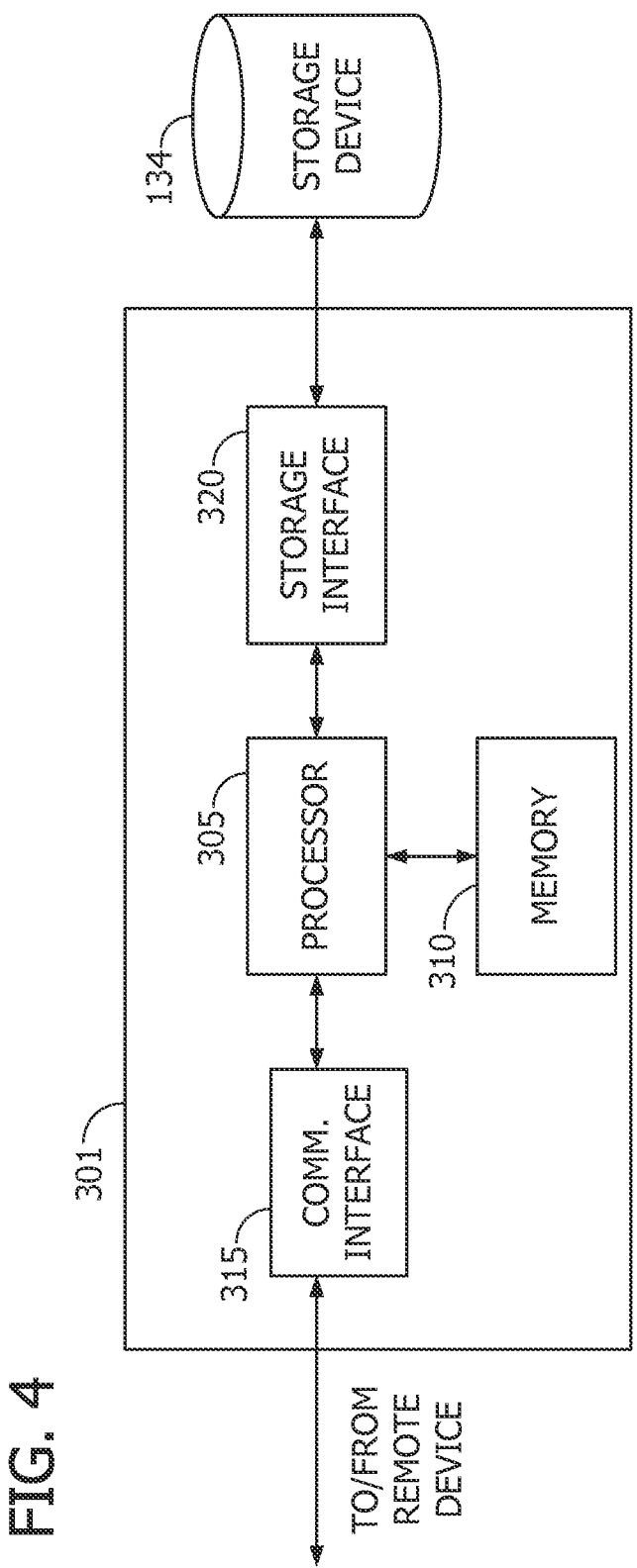

FIG. 4 illustrates an example configuration of a server system 301 such as rewards program computer system 112

(shown in FIG. 2). Server system 301 may include, but is not limited to, database server 116. In the example embodiment, server system 301 facilitates the transfer of reward points between a plurality of mobile computing devices 114 (shown in FIG. 2), as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from mobile computing devices 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
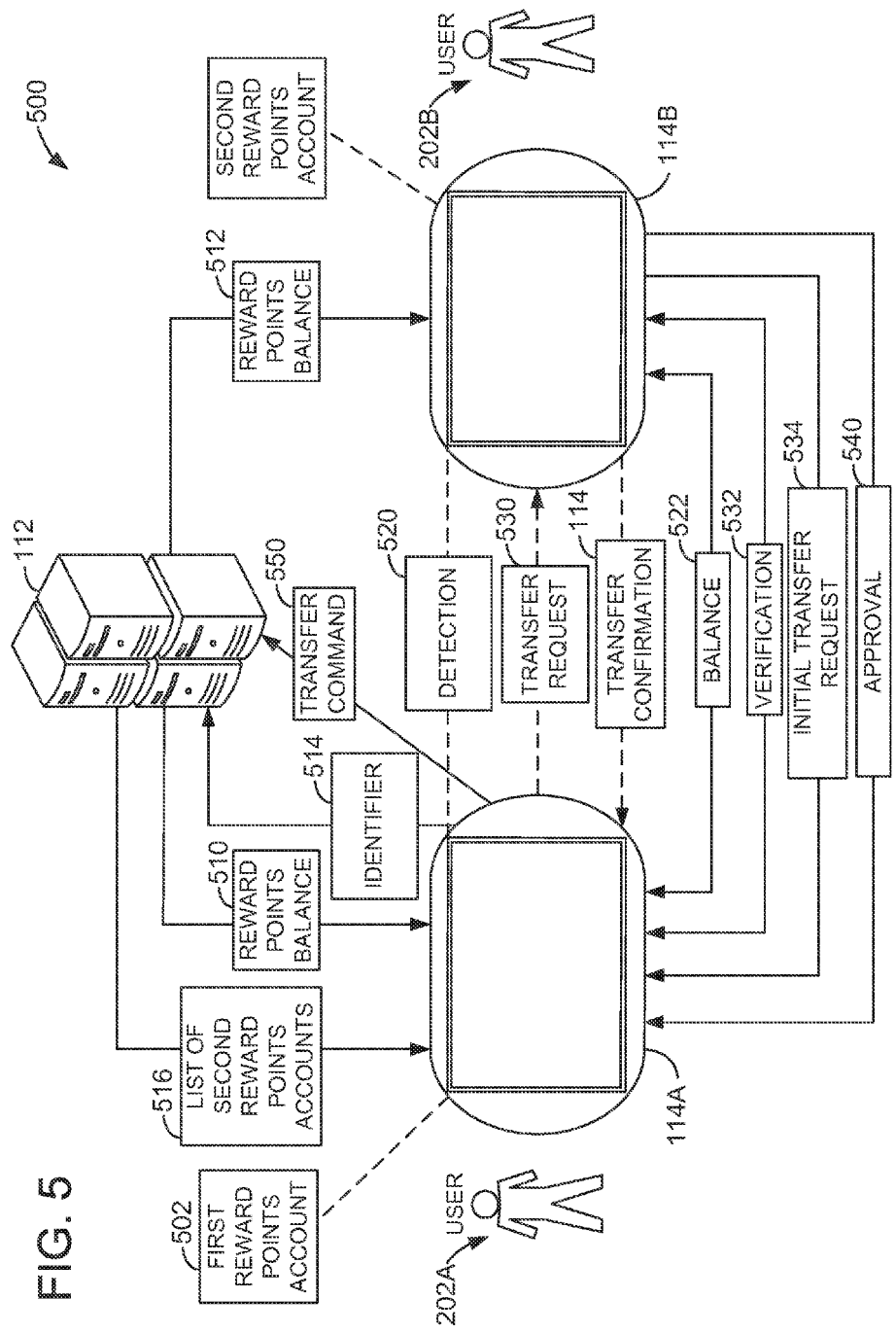

FIG. 5 is a data flow diagram of mobile computing devices 114A and 114B communicating with rewards program computer system 112. Mobile computing devices 114A and 114B are each substantially representative of mobile computing device 114 as shown and described in FIGS. 2 and 3. For ease of description, although mobile computing devices 114A and 114B are substantially similar, they are identified separately to explain the interaction between one another and with rewards program computer system 112. Accordingly, mobile computing device 114A is referred to as first mobile computing device 114A and mobile computing device 114B is referred to as second mobile computing device 114B. As described above, mobile computing devices 114A and 114B are in communication with one another and in communication with rewards program computer system 112.

Figure 6:
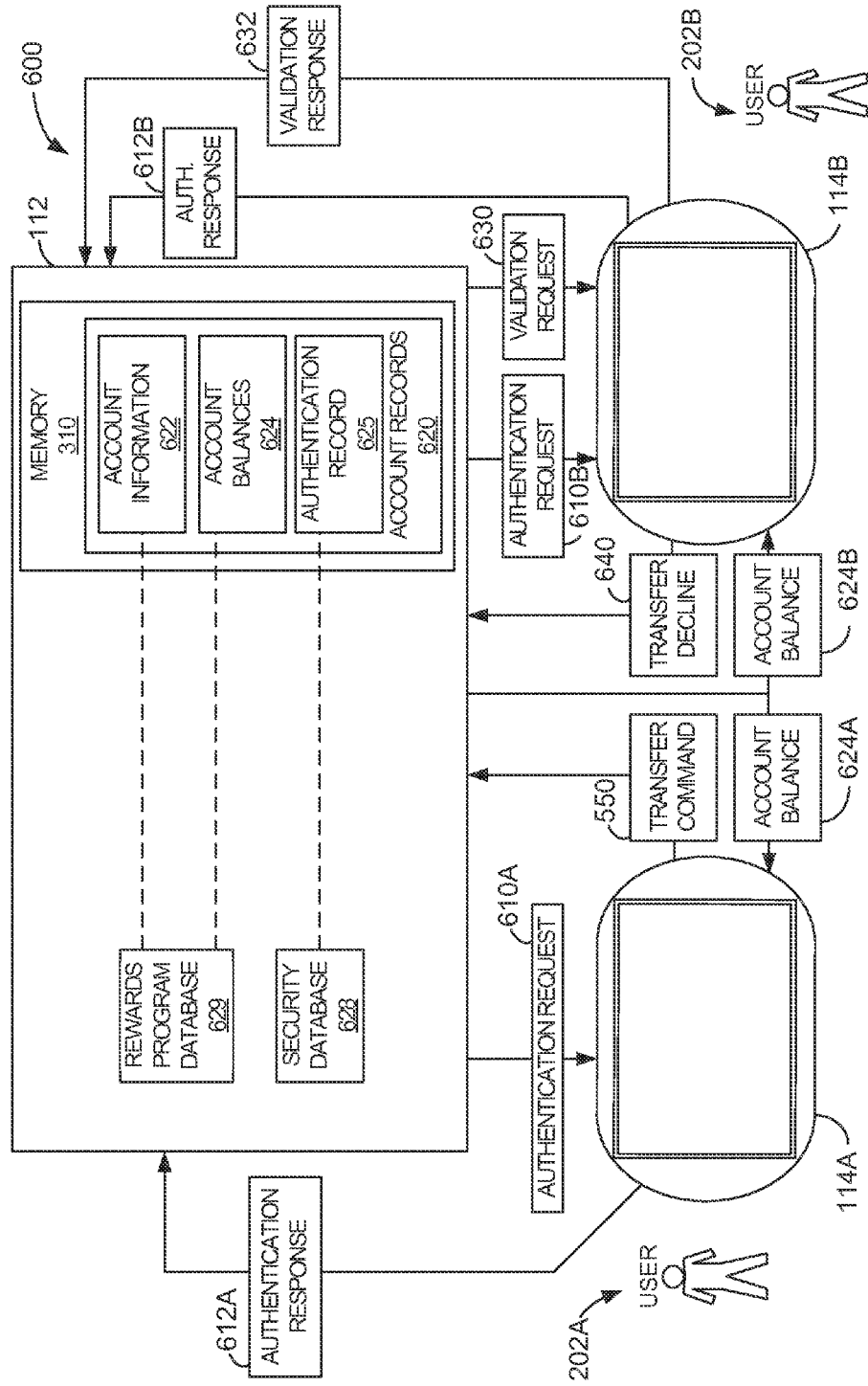

Mobile computing devices 114A and 114B are associated with a rewards program managed by rewards program computer system 112 as further described in FIG. 6. Accordingly, first mobile computing device 114A is associated with a first reward points account 502 and second mobile computing device 114B is associated with a second reward points account 504. First mobile computing device 114A receives a reward points balance 510 associated with first reward points account 502 from rewards program computer system 112. Second mobile computing device 114B also receives second reward points balance 512 associated with second reward points account 504 from rewards program computer system 112.

First mobile computing device 114A detects 520 second mobile computing device 114B associated with the second reward points account 504. First mobile computing device 114A detects second mobile computing device 114B using any appropriate protocol of communication associated with mobile computing devices including, as described herein, near field communication, Bluetooth®, Wi-Fi, infrared, radio-frequency, or any appropriate wireless communication protocol. First mobile computing device 114A accordingly detects mobile computing devices 114 that are within a proximity range. The proximity range may be determined by user 202A, defaults of first mobile computing device 114A, or defaults set by rewards program computer system 112 in facilitating the rewards program. In one example, first mobile computing device 114A may detect second mobile computing devices 114B within a range of one hundred meters, or another range that may be selectable by a user of the first or second mobile computing devices 114A and 114B, from first mobile computing device 114A based upon settings determined by user 202A. In another example, first mobile computing device 114A may only detect mobile computing devices 114 that are associated with first reward points account 502 associated with first mobile computing device 114A. In such examples, first reward points account 502 may be associated with lists of, for example and without limitation, "Friends" or "Contacts." Such lists represent predefined lists of users associated with a reward points account. Accordingly, such lists define users with which a particular rewards account may interact. In the example embodiment, first reward points account 502 is associated with list of second reward points accounts 516. Further, list of second reward points accounts 516 may include references to specific account identifiers including identifiers for, for example, second reward points account 504. In this example, first mobile computing device 114A detects mobile computing devices 114 associated with reward points accounts associated with the list of "Friends" or "Contacts." In additional examples, first mobile computing device 114A detects mobile computing devices 114 within a proximity range and additionally with reward points accounts associated with the list of "Friends" or "Contacts." In some examples, the association between first reward points accounts 502 and second reward points accounts 504 is stored at memory 210 (shown in FIG. 3) of first mobile computing device 114A. In other examples, the association between first reward points accounts 502 and second reward points accounts 504 is stored in rewards program computer system 112. In such examples, detecting second mobile computing device 114B also includes first mobile computing device 114A sending an identifier 514 for first reward points account 502 to rewards program computer system 112. Rewards program computer system 112 retrieves, from memory 310 (shown in FIG. 4), a list of second reward points accounts 516 associated with first reward points account 502 and transmits list of second reward points accounts 516 to first mobile computing device 114A. First mobile computing device 114A accordingly receives list of second reward points accounts 516 and detects second mobile computing device 114B based upon list of second reward points accounts 516 and the availability of mobile computing devices 114 within a range of communication because list of second reward points accounts 516 includes a reference to second reward points account 504.

In some embodiments, when first mobile computing 114A device detects second mobile computing device 114B, first mobile computing device 114A and second mobile computing device 114B exchange balance information 522 related to their respective reward points accounts. Users of mobile computing devices 114A and 114B may be made aware of balances 522 associated with each reward points account, for example via a display on the respective devices, and can determine whether a transfer is appropriate.

First mobile computing device 114A initiates a transfer request 530 to second mobile computing device 114B. Transfer request 530 represents a request from first mobile computing device 114A to second mobile computing device 114B to transfer at least one reward point between first reward points account 502 and second reward points account 504. For example, first mobile computing device 114A sends a request to transfer points to second mobile computing device 114B. Alternately, first mobile computing device 114A may initially detect a plurality of secondary mobile computing devices 114 and select second mobile computing device 114B from plurality of secondary mobile computing devices 114 to which to initiate transfer request 530.

Initiating transfer request 530 also includes verification process 532. Verification process 532 may be applied based upon user preferences, requirements of the rewards program, the frequency of interaction between first reward points account 502 and second reward points account 504, and the total amount of points transferred in the transfer request. For example, users 202A and 202B or rewards programs may wish to verify every transfer to ensure security. Alternately, users 202A and 202B or rewards programs may set standards such that infrequent transferors require verification. Additionally, transfers beyond certain minimum thresholds of reward points may trigger verification. Verification process 532 may be accomplished by first mobile computing device 114A verifying the transfer request with a first verification and further receiving a second verification from second mobile computing device 114B. The first and second verification may take any appropriate form including, for example, a user-provided authorization of the transfer via a user-input at the first or second mobile computing device, a security check, and any other appropriate method of verification.

In an alternative example, transfer request 530 may be triggered by second mobile computing device 114B. In this example, first mobile computing device 114A receives initial transfer request 534 from second mobile computing device 114B. Initial transfer request 534 represents a request by second mobile computing device 114B for first mobile computing device 114A to initiate transfer request 530. In other words, second mobile computing device 114B is asking for first mobile computing device 114A to transfer reward points. First mobile computing device 114A receives approval for initial transfer request 534 from, for example, user 202A reviewing initial transfer request 534. First mobile computing device 114A, upon receiving initial transfer request approval, automatically sends transfer command 550 to rewards program computer system 112.

All communication, including detection and transfer, between first mobile computing device 114A and second mobile computing device 114B may be facilitated using any appropriate wireless communication protocol. In the example embodiment, such communication uses near field communication (NFC). NFC is a set of standards used by mobile computing devices 114 to establish communication by mobile computing devices 114 by bringing mobile computing devices 114 into proximity with one another. As used herein, NFC may include any communication standard appropriate to such interaction including, without limitation, ISO/IEC 18092/ECMA-340, ISO/IEC 21481/ECMA-352, GSMA, and StoLPaN. Alternatively, as used herein, the communication facilitated NFC may include the use of applications which depend on NFC including, for example and without limitation, Bump™ and Android™ Beam. (Bump is a trademark of Bump Technologies, Inc., Mountain View, Calif.; Android is a trademark of Google Inc., Mountain View, Calif.) Accordingly, using such applications or NFC standards allows a mobile computing device such as first mobile computing device 114A to identify presence of other mobile computing devices 114 such as second mobile computing device 114B. When first mobile computing device detects 520 or otherwise interacts with second mobile computing device 114B or, alternately, plurality of secondary mobile computing devices 114, first mobile computing device 114A substantially uses an NFC protocol including, for example, GSMA, or an NFC-based application including, for example, Bump™.

Initiating transfer request 530 includes defining the conditions of the transfer. Accordingly, initiating transfer request 530 includes receiving, at first mobile computing device 114A, a transfer type, a transfer amount, a transfer originator, and a transfer receiver from a user such as user 202A. For example, transfer request 530 may be a transfer from first reward points account 502 to second reward points account 504 or vice versa. The transfer request may also indicate the amount of points transferred. In the example embodiment the transfer originator is first mobile computing device 114A and the transfer receiver is second mobile computing device 114B.

Transfer request 530 is successfully completed when first mobile computing device 114A receives an indication of approval 540 from second mobile computing device 114B. For example, first mobile computing device 114A may receive approval 540 from second mobile computing device 114B, validating that account holder 202B associated with second mobile computing device 114B and second reward points account 504 approves of the transaction.

Upon successfully completing transfer request 530 via receipt of approval 540, first mobile computing device 114A sends a transfer command 550 to rewards program computer system 112. Transfer command 550 instructs rewards program computer system 112 to transfer at least one reward point between the first reward points account 502 and the second reward points account 504 based upon the conditions of the transfer.

Upon successful transfer, as described further in FIG. 6, first mobile computing device 114A and second mobile computing device 114B receive an updated first reward points balance 510 and second reward points balance 512, respectively, from rewards program computer system 112.

FIG. 6 is a second data flow diagram 600 of mobile computing devices 114A and 114B communicating with rewards program computer system 112. Rewards program computer system 112 receives transfer command 550 from first mobile computing device 114A. Transfer command 550 instructs rewards program computer system 112 to transfer at least one reward point between a first reward points account 502 (shown in FIG. 5) associated with first mobile computing device 114A and a second reward points account 504 (shown in FIG. 5) associated with second mobile computing device 114B. Rewards program computer system 112 receives transfer command 550 using any appropriate communication protocol. The received transfer command also includes conditions of the transfer including, for example and without limitation, transfer type, transfer amount, transfer time, transfer recipient, and transfer originator.

Rewards program computer system 112 may, in some examples, as described above, send authentication requests 610A and 610B to first and second mobile computing devices 114A and 114B, respectively. Authentication requests 610A and 610B may be based on preferences of users 202A and 202B associated with first reward points account 502 and/or second reward points account 504, the preferences of the rewards program, or characteristics associated with transfer command 550 as described above. Rewards program computer system 112 transmits authentication requests 610A and 610B to first mobile computing device 114A and/or second mobile computing device 114B. Authentication requests 610A and 610B include, for example and without limitation, a request for a username and password, a request for a secondary security credential, a signature, and any other appropriate security information. Rewards program computer system 112 receives authentication responses 612A and 612B from first mobile computing device 114A and second mobile computing device 114B, respectively. Authentication responses 612A and 612B include account credentials associated with first reward points account 502 and/or second reward points account 504. Rewards program computer system 112 checks authorization response 612A against an authentication record 625 associated with first reward points account 502. Authentication record 625 represents a record including security credentials associated with first reward points account 502. Similarly, rewards program computer system 112 checks authorization response 612B against an authentication record 625 associated with second reward points account 504. Authentication record 625 may be retrieved from account records 620 or alternately from security database 628. Security database 628 may contain information related to security profiles associated with account holders such as users 202A and 202B.

Rewards program computer system 112 retrieves a first account balance 624A associated with the first reward points account 502 and a second account balance 624B associated with the second reward points account 504. In one example, rewards program computer system 112 retrieves first and second account balances 624A and 624B from memory 310. In another example, rewards program computer system 112 retrieves first and second account balances 624A and 624B from rewards program database 629. As indicated in FIG. 6, memory 310 may store account records 620 related to reward points accounts. Rewards program computer system 112 validates transfer command 550 against retrieved first account balance 624A and retrieved second account balance 624B. Rewards program computer system 112 validates by determining that neither first account balance 624A nor second account balance 624B has a negative value after transfer command 550 is processed. Alternatively, rewards program computer system 112 may validate transfer command 550 to ensure that transfer command 550 complies with requirements associated with the first reward points account 502 and the second reward points account 504 including, for example, ensuring that the first reward points balance and the second reward points balance meet minimum balance requirements after transfer command 550 is processed.

In at least some examples, rewards program computer system 112 may validate that second mobile computing device 114B authorized transfer command 550 before executing transfer command 550. Such validation may be valuable to prevent fraud or other misuse. Rewards program computer system 112 sends validation request 630 to second mobile computing device 114B, receives validation response 632 from second mobile computing device 114B, and confirms validation response 632.

Upon validating transfer command 550, rewards program computer system 112 updates first reward points balance 624A and second reward points balance 624B by processing transfer command 550. Updating first reward points balance 624A and second reward points balance 624B substantially represents updating account records 620 in memory 310 or updating rewards program database 629. Rewards program computer system 112 transmits an updated account balance 624A and 624B to at least one of first mobile computing device 114A and second mobile computing device 114B. First mobile computing device 114A and second mobile computing device 114B accordingly receive updated account balances 624A and 624B, respectively, from rewards program computer system 112.

In at least some examples, second mobile computing device 114B may transmit transfer decline 640 to rewards program computer system 112. In some examples, transfer decline 640 may be made after validation response 632. Transfer decline 640 represents second mobile computing device 114B seeking to stop or reverse transfer command 550. Rewards program computer system 112 receives transfer decline 640 from second mobile computing device 114B and reverses or aborts transfer command 550, depending on whether transfer command 550 has executed.

Figure 7:
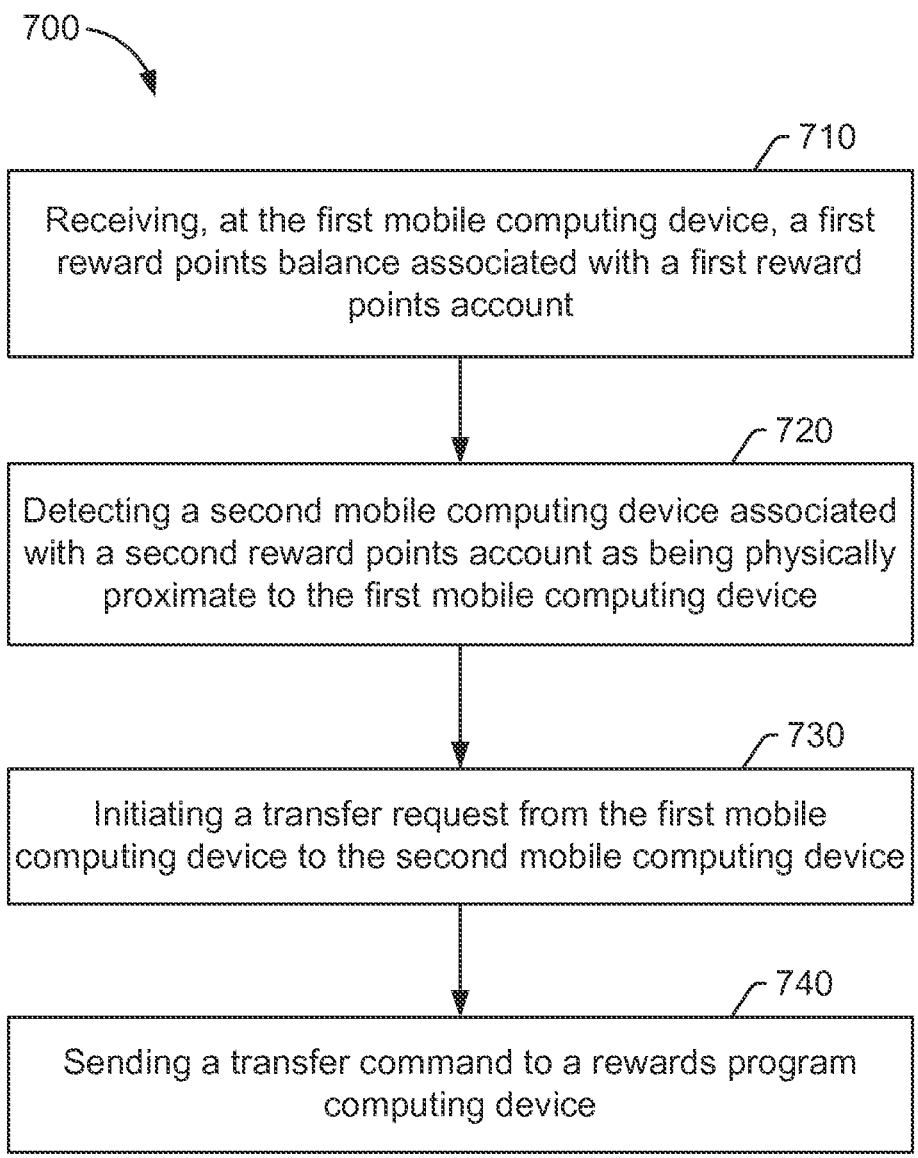

FIG. 7 is a simplified diagram of an example method 700 for use in transferring reward points between plurality of mobile computing devices 114A and 114B (shown in FIG. 5) using mobile computing device 114 (shown in FIG. 4). First mobile computing device 114A receives 710 a first reward points balance associated with a first reward points account 502 (shown in FIG. 5). Receiving 710 represents first mobile computing device 114A receiving reward points balance 510 (shown in FIG. 5) from rewards program computer system 112 (shown in FIG. 5).

First mobile computing device 114A also detects 720 a second mobile computing device associated with a second reward points account 504 (shown in FIG. 5) as being physically proximate to the first mobile computing device. Detecting 720 represents first mobile computing device 114A detecting second mobile computing device 114B using any appropriate communication protocol. In the example embodiment, detecting 720 is performed using near field communication.

First mobile computing device 114A additionally initiates 730 transfer request from the first mobile computing device to the second mobile computing device. Initiating 730 represents first mobile computing device sending transfer request 530 (shown in FIG. 5) to second mobile computing device 114B.

First mobile computing device 114A further sends 740 a transfer command to a rewards program computing device. Sending 740 represents first mobile computing device 114A sending transfer command 550 to rewards program computing device 112.

Figure 8:
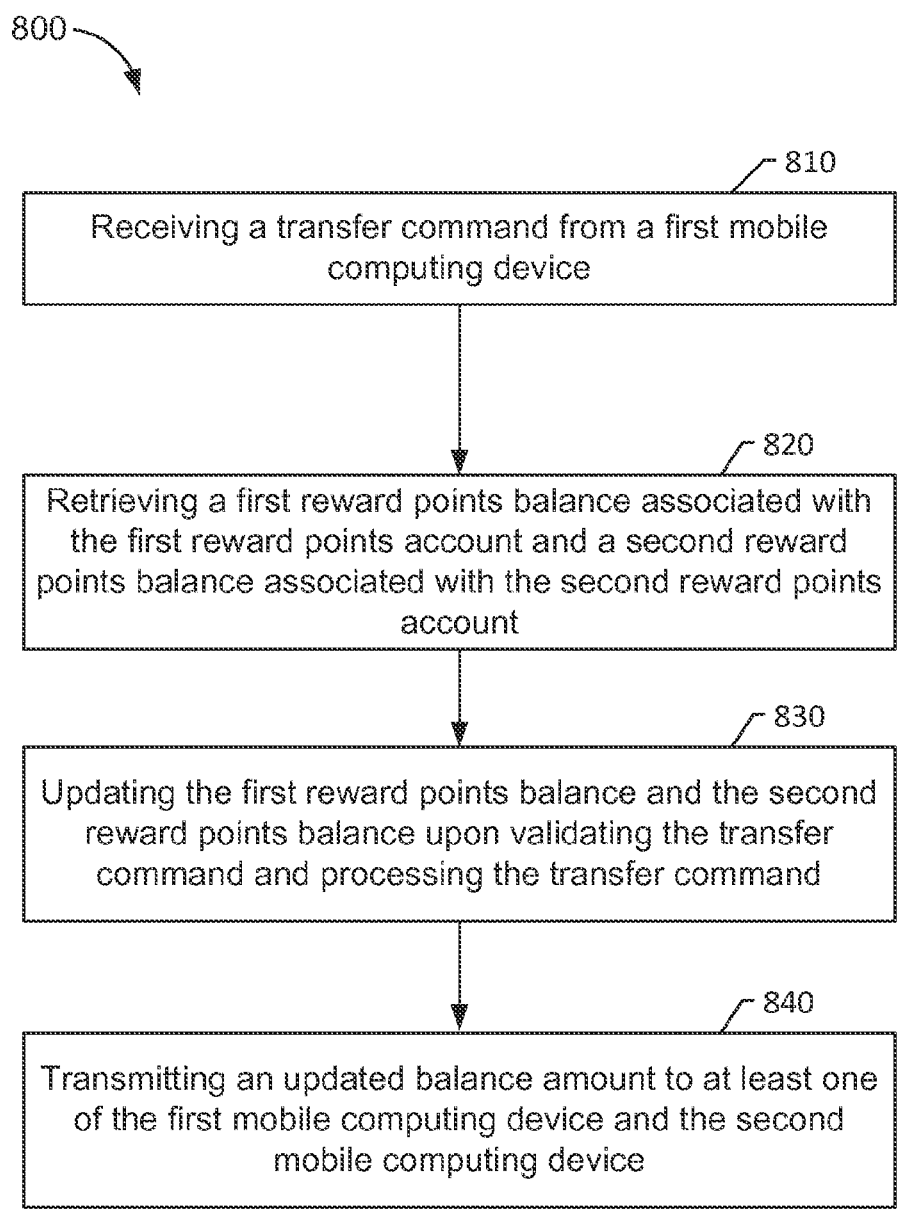

FIG. 8 is a simplified diagram of an example method 800 for facilitating the transfer of reward points between a plurality of mobile computing devices 114A and 114B (shown in FIG. 5) using rewards program computer system 112 (shown in FIG. 4). Rewards program computer system 112 receives 810 a transfer command from a first mobile computing device. Receiving 810 represents rewards program computer system 112 receiving transfer command 550 from first mobile computing device 114A.

Rewards program computer system 112 retrieves 820 first reward points balance associated with first reward points account 502 (shown in FIG. 5) and second reward points balance associated with second reward points account 504 (shown in FIG. 5). Retrieving 820 represents rewards program computer system 112 retrieving account information 622 and account balances 624 associated with account records 620 for a first reward points account 502 and a second reward points account 504 from at least one of memory 310 and rewards program database 629 (all shown in FIG. 6).

Rewards program computer system 112 also updates 830 the first reward points balance and the second reward points balance upon validating the transfer command and processing the transfer command. Updating represents rewards program computer system 112 processing transfer command 550 and updating account records 620 for each of first reward points account 502 and second reward points account 504 in at least one of memory 310 and rewards program database 629.

Rewards program computer system 112 further transmits 840 an updated balance amount to at least one of the first mobile computing device and the second mobile computing device. Transmitting 840 represents rewards program computer system 112 sending an updated balance amount to at least one of first mobile computing device 114A and second mobile computing device 114B.

Figure 9:
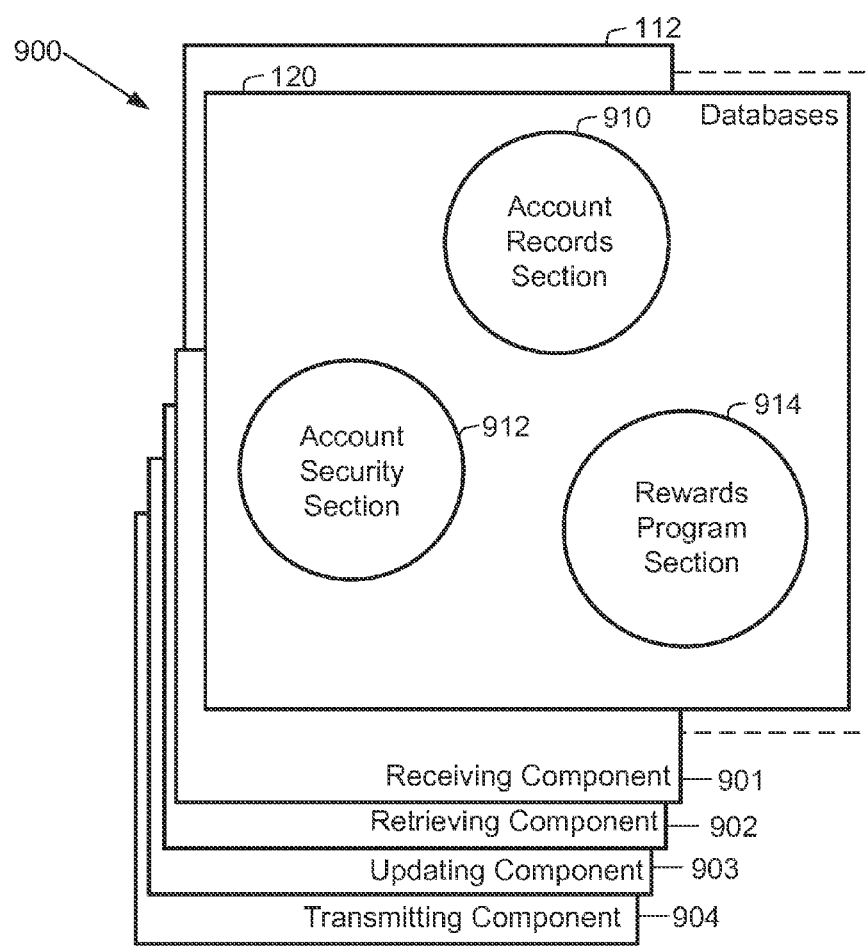

FIG. 9 is a diagram of components 900 of one or more example rewards program computer systems 112 that may be used in the environment shown in FIGS. 5 and 6. FIG. 9 further shows a configuration of databases including at least database 120 (shown in FIG. 1). Database 120 is coupled to several separate components within rewards program computer system 112, which perform specific tasks.

Rewards program computer system 112 includes a receiving component 901 for receiving a transfer command from a first mobile computing device. Rewards program computer system 112 also includes a retrieving component 902 for retrieving a first reward points balance associated with the first reward points account 502 (shown in FIG. 5) and a second reward points balance associated with the second reward points account 504 (shown in FIG. 5). Rewards program computer system 112 additionally includes an updating component 903 for updating the first reward points balance and the second reward points balance upon validating the transfer command and processing the transfer command. Rewards program computer system 112 additionally includes a transmitting component 904 for transmitting an updated balance amount to at least one of the first mobile computing device and the second mobile computing device.

In an exemplary embodiment, database 120 is divided into a plurality of sections, including but not limited to, an account records section 910, an account security section 912, and a rewards program section 914. These sections within database 120 are interconnected to update and retrieve the information as required.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A computer-implemented method for transferring reward points between separate mobile computing devices, the method implemented by a first mobile computing device in communication with a memory, the method comprising:
   receiving, at the first mobile computing device, a first reward points balance associated with a first reward points account;
   detecting, by the first mobile computing device, a second mobile computing device associated with a second reward points account based upon a determination, by the first mobile computing device, that the second reward points account has an association with the first awards points account and a second reward points balance, and that the second mobile computing device is within a predetermined proximity of the first mobile computing device, wherein the first mobile computing device is different from the second mobile computing device;
   initiating a transfer request from the first mobile computing device to the second mobile computing device, the transfer request representing a request from the first mobile computing device to the second mobile computing device to transfer at least one reward point between the first reward points account and the second reward points account; and sending a transfer command to a rewards program computer system, the transfer command instructing the rewards program computer system to transfer the at least one reward point between the first reward points account and the second reward points account, upon successfully completing the transfer request.

2. The method of claim 1, wherein initiating a transfer request further comprises initiating the transfer request using near-field communication.

3. The method of claim 1, further comprising:
receiving an initial transfer request from the second mobile computing device, the initial transfer request representing a request by the second mobile computing device for the first mobile computing device to initiate the transfer request, based on a determination, by the second mobile computing device, that the second rewards points account has an association with the first rewards points account;
receiving, at the first mobile computing device, an initial transfer request approval; and
automatically sending the transfer command to the rewards program computer system.

4. The method of claim 1, wherein initiating a transfer request further comprises:
verifying the transfer request with a first verification at the first mobile computing device; and
receiving a second verification from the second mobile computing device.

5. The method of claim 1, wherein initiating a transfer request further comprises:
receiving, at the first mobile computing device, a transfer type and a transfer amount.

6. The method of claim 1, wherein detecting a second mobile computing device further comprises at least one of:
transmitting the first reward points balance to the second mobile computing device; and
receiving a second reward points balance associated with the second reward points account from the second mobile computing device.

7. The method of claim 1, further comprising:
receiving an updated first reward points balance from the rewards program computer system.

8. A computer-implemented method for transferring reward points between a plurality of mobile computing devices, the method implemented by a rewards program computer system in communication with a memory, the method comprising:
determining that a first mobile computing device is within a predetermined proximity of a second mobile computing device different from the first mobile computing device, that the first mobile computing device is associated with a first rewards points account, that the second mobile computing device is associated with a second rewards points account, and that the first and second rewards points accounts share an association;
receiving a transfer command from the first mobile computing device, the transfer command instructing the rewards program computer system to transfer at least one reward point between the first reward points account and the second reward points account;
retrieving a first reward points balance associated with the first reward points account and a second reward points balance associated with the second reward points account from a rewards program database;

updating the first reward points balance and the second reward points balance at the rewards program database by processing the transfer command upon validating the transfer command; and
transmitting an updated balance amount to at least one of the first mobile computing device and the second mobile computing device.

9. The method of claim 8, further comprising:
transmitting an authentication request to the first mobile computing device;
receiving an authentication response from the first mobile computing device, wherein the authentication response includes account credentials associated with the first reward points account; and
checking the authentication response against an authentication record associated with the first reward points account.

10. The method of claim 8, further comprising:
receiving a transfer decline from the second mobile computing device; and
reversing or aborting the transfer command, depending on whether the first reward points balance and the second reward points balance have been updated.

11. The method of claim 8, further comprising:
verifying the transfer command by determining that the first reward points balance does not have a negative value after the transfer command is processed.

12. The method of claim 8, wherein validating the transfer command further comprises:
sending a validation request to the second mobile computing device;
receiving a validation response from the second mobile computing device; and
confirming, at the rewards program computer system, the validation response.

13. The method of claim 8, wherein receiving a transfer command from a first mobile computing device further comprises:
receiving a transfer type and a transfer amount.

14. The method of claim 8, further comprising:
receiving an identifier for a first reward points account;
retrieving, from the memory, a plurality of second reward points accounts associated with the first reward points account; and
transmitting the plurality of second reward points accounts to the first mobile computing device.

15. A system for facilitating the transfer of reward points between a plurality of mobile computing devices, comprising:
a rewards program computer system comprising a processor in communication with a memory, said processor configured to:
determine that a first mobile computing device is within a predetermined proximity of a second mobile computing device different from the first mobile computing device, that the first mobile computing device is associated with a first rewards points account, that the second mobile computing device is associated with a second rewards points account, and that the first and second rewards points accounts share an association;
receive a transfer command from the first mobile computing device, the transfer command instructing said rewards program computer system to transfer at least one reward point between the first reward points account and the second reward points;

retrieve a first reward points balance associated with the first reward points account and a second reward points balance associated with the second reward points account;

update the first reward points balance and the second reward points balance by processing the transfer command upon validating the transfer command; and transmit an updated balance amount to at least one of the first mobile computing device and the second mobile computing device.

16. A system in accordance with claim 15, wherein said processor is further configured to:

transmit an authentication request to the first mobile computing device;

receive an authentication response from the first mobile computing device, wherein the authentication response includes account credentials associated with the first reward points account; and check the authentication response against an authentication record associated with the first reward points account.

17. A system in accordance with claim 15, wherein said processor is further configured to:

receive a transfer decline from the second mobile computing device; and reverse or abort the transfer command, depending on whether the first reward points balance and the second reward points balance have been updated.

18. A system in accordance with claim 15 wherein said processor is further configured to:

verify the transfer command by determining that the first reward points balance does not have a negative value after the transfer command is processed.

19. A system in accordance with claim 15 wherein said processor is further configured to:

send a validation request the second mobile computing device;

receive a validation response from the second mobile computing device; and confirm, at said rewards program computer system, the validation response.

20. A system in accordance with claim 15 wherein said processor is further configured to:

receive an identifier for a first reward points account;

retrieve, from said memory, a plurality of second reward points accounts associated with the first reward points account; and transmit the plurality of second reward points accounts to the first mobile computing device.

* * * * *